Sept. 13, 1938.    R. C. JACOBS    2,130,186
AUTOMOBILE HOOD PROP
Filed Aug. 28, 1937
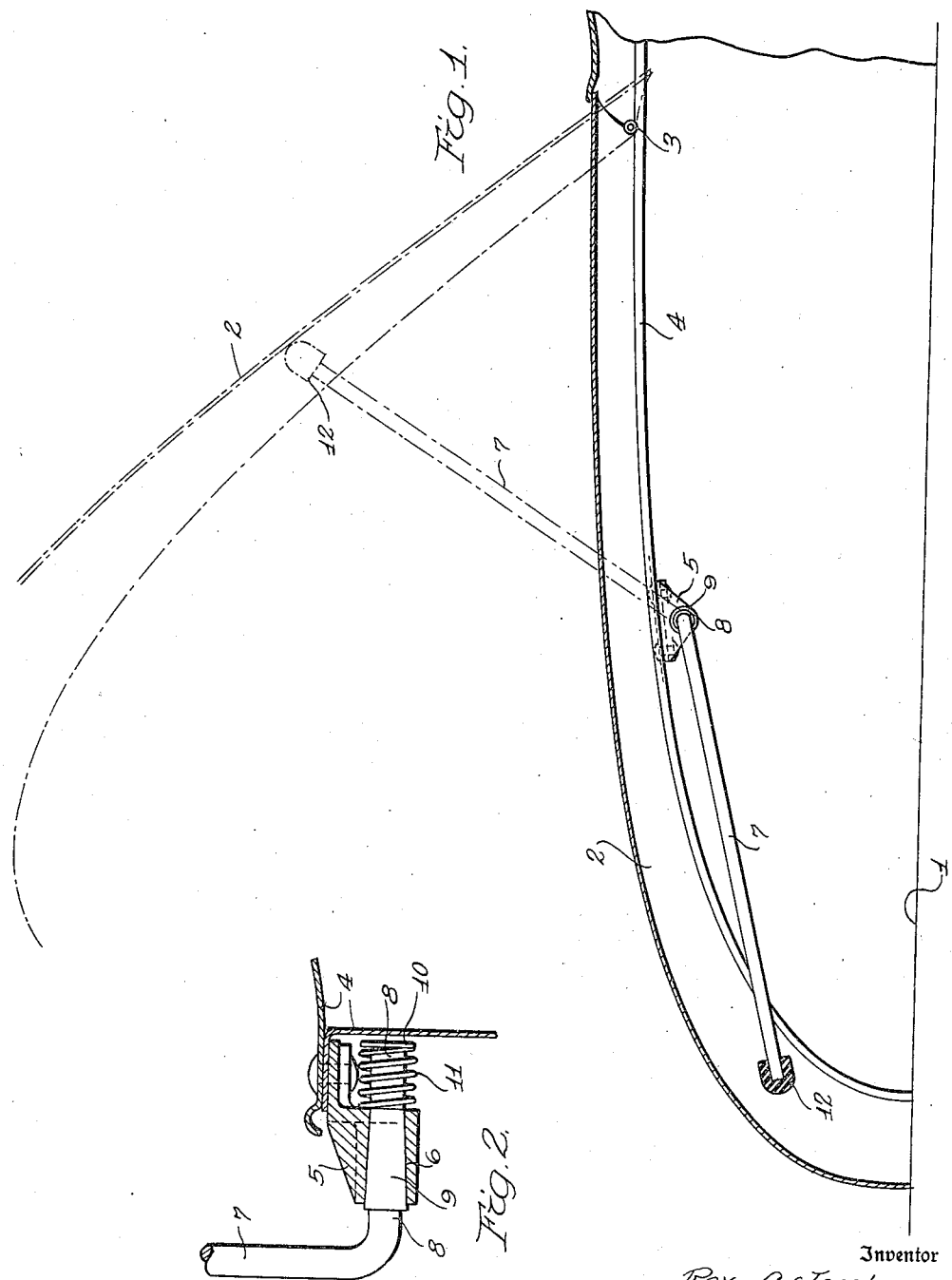
Inventor
Rex C. Jacobs
By 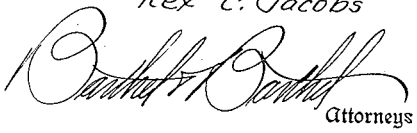
Attorneys Patented Sept. 13, 1938

2,130,186

UNITED STATES PATENT OFFICE 2,130,186

AUTOMOBILE HOOD PROP

Rex C. Jacobs, Detroit, Mich.

Application August 28, 1937, Serial No. 161,396

7 Claims. (Cl. 217—60)

This invention relates to a prop designed particularly for supporting the hingedly mounted engine hood of an automobile in an open position.

The primary object of the invention is to provide a prop of the character above referred to having means supporting the same whereby it may be swung from a normal or inoperative position to a position where it supports the engine hood elevated, said supporting means embodying friction creating means for holding the prop in various positions of adjustment.

Another object of the invention is to provide a device of the character referred to embodying a socket and a bent arm having one end received therein whereby the other end may be swung therearound. More specifically, the socket is tapered, the arm end received therein is correspondingly tapered, and spring means act upon the tapered arm portion to wedge it into the socket and to thereby induce sufficient friction to hold the swinging end of the arm in its various positions of adjustment.

With the above and other ends in view the invention is more particularly described with reference to the accompanying drawing, in which—

Figure 1 is a fragmental section of an automobile body, illustrating a rear deck, a hingedly mounted lid therefor, and the present prop assembled with respect thereto, and Fig. 2 is a fragmental section taken on a plane transverse to Fig. 1.

Like characters of reference are employed throughout to designate corresponding parts.

In the drawing there is shown a fragment 1 of an automobile, having an engine hood 2 hingedly mounted at 3 to cover the same. Rigidly mounted on the side wall 4 of the automobile body is a bracket 5 having a tapered socket 6 therein. A bent arm having an elongate portion 7 and a comparatively short portion 8 which is upset by a cold heading process to provide a tapered head 9 thereon. On the extremity of the arm portion 8 is mounted a collar 10, and a coil spring 11 is compressed between the collar and the adjacent wall of the bracket 5. The spring tends to draw the tapered head into the tapered socket and thereby induces sufficient friction to hold the arm 7 in various positions.

Mounted upon the extremity of the rod arm 7 is a rubber cushion 12, adapted when the rod portion 7 is manually positioned as shown in broken lines in Fig. 1 to engage the hood 2 to hold it in an elevated position. The arm portion 7 is positioned as shown in full lines when the hood is closed.

Although a specific embodiment of the invention has been illustrated and described it will be understood that various changes may be made within the scope of the appended claims without departing from the spirit of the invention, and such changes are contemplated.

What I claim is:—

1. In combination with an automobile body having a hingedly mounted hood, a prop for holding said hood open, said prop comprising a bracket mounted on a stationary portion of the body adjacent the hood, said bracket having a tapered socket, a tapered head in said socket, an arm connected to said head and swingably supported with respect to said bracket thereby, and a spring urging said head into said socket to thereby induce friction yieldably opposing rotation of the head.

2. In combination with an automobile body having a hingedly mounted hood, a prop for holding said hood open, said prop comprising a bracket mounted on a stationary portion of the body adjacent the hood, said bracket having a tapered socket, a tapered head in said socket, an arm connected to said head and swingably supported with respect to said bracket thereby, a spring urging said head into said socket to thereby induce friction yieldably opposing rotation of the head, and a cushion member on the end of said arm for frictionally engaging said lid when the latter is open.

3. In combination with an automobile body having a hingedly mounted hood, a prop for holding said hood open, said prop comprising a bracket mounted on a stationary portion of the body adjacent the hood, a bent arm having an elongate portion substantially perpendicular to the other portion thereof, said bracket having a tapered socket, said other bent arm portion having a tapered head received in said tapered socket, and spring means urging said head into frictional engagement with said socket.

4. A prop comprising a bracket, said bracket having a tapered socket, a tapered head received in said socket, resilient means urging said head into said socket, and an arm rigidly connected to said head.

5. In a device of the character described, a bracket having a tapered socket, a rod having angularly bent portions, one of said portions having a tapered head, said head being disposed in said socket, and a spring urging said head into frictional engagement with said socket.

6. In a device of the character described, a bracket having a tapered socket, a rod having angularly bent portions, one of said portions being upset to provide a conical head thereon, said head being disposed in said socket, and a spring urging said head into frictional engagement with said socket.

7. In a device of the character described, a bracket having a tapered socket, a rod having angularly bent portions, one of said portions having a tapered head, said headed portion being extended through said socket, a retainer on the extremity of the headed portion, and a spring compressed between said retainer and the adjacent wall of said bracket and adapted to draw said head into said socket.

REX C. JACOBS.